United States Patent [19]
Botsford, III et al.

[11] Patent Number: 5,907,363
[45] Date of Patent: May 25, 1999

[54] METHOD FOR CONTROLLING A COMPRESSED DATA BUFFER

[75] Inventors: Nelson Botsford, III, Somerville; Rajesh Hingorani, Princeton Junction; David Thomas, Summit, all of N.J.

[73] Assignee: Lucent Technologies Inc., Murray Hill, N.J.

[21] Appl. No.: 08/738,998

[22] Filed: Oct. 29, 1996

Related U.S. Application Data

[63] Continuation of application No. 08/327,176, Oct. 21, 1994, abandoned.

[51] Int. Cl.$^6$ ....................................................... H04N 7/24
[52] U.S. Cl. ........................................... 348/419; 348/390
[58] Field of Search ................................... 348/384, 390, 348/391, 409–412, 415, 419, 700; 382/232, 233, 235, 236, 238; H04N 7/130

[56] References Cited

U.S. PATENT DOCUMENTS

| | | | |
|---|---|---|---|
| 4,077,053 | 2/1978 | Ishiguro | 348/415 |
| 4,396,937 | 8/1983 | Reitmeier et al. | 348/391 |
| 4,517,596 | 5/1985 | Suzuki | 348/419 |
| 4,799,154 | 1/1989 | Matthews et al. | |
| 5,040,062 | 8/1991 | Knauer et al. | |
| 5,043,808 | 8/1991 | Knauer et al. | |
| 5,128,756 | 7/1992 | Johnston et al. | |
| 5,134,475 | 7/1992 | Johnston et al. | |
| 5,134,477 | 7/1992 | Knauer et al. | |
| 5,136,377 | 8/1992 | Johnston et al. | |
| 5,144,423 | 9/1992 | Knauer et al. | |
| 5,204,916 | 4/1993 | Hamilton, Jr. et al. | |
| 5,214,507 | 5/1993 | Aravind et al. | |
| 5,216,503 | 6/1993 | Paik et al. | 348/390 |
| 5,229,852 | 7/1993 | Maietta et al. | |
| 5,231,484 | 7/1993 | Gonzales et al. | |
| 5,233,410 | 8/1993 | Fairhurst | |
| 5,243,419 | 9/1993 | Faryar et al. | |
| 5,245,441 | 9/1993 | Ruben | |
| 5,247,363 | 9/1993 | Sun et al. | |
| 5,253,056 | 10/1993 | Puri et al. | |
| 5,253,059 | 10/1993 | Ansari et al. | 348/390 |
| 5,268,938 | 12/1993 | Feig et al. | |
| 5,270,813 | 12/1993 | Puri et al. | |
| 5,274,364 | 12/1993 | Li et al. | |
| 5,278,647 | 1/1994 | Hingorani et al. | |
| 5,287,182 | 2/1994 | Haskell et al. | |
| 5,293,229 | 3/1994 | Iu | |
| 5,294,974 | 3/1994 | Naimpally et al. | |
| 5,305,102 | 4/1994 | Knauer et al. | |
| 5,317,398 | 5/1994 | Casavant et al. | |
| 5,325,125 | 6/1994 | Naimpally et al. | |

OTHER PUBLICATIONS

IMPEG Test Model 4, "Coded Representation of Picture and Audio Information", ISO–IEC/JTC1/SC29/EG11, CCITT SG XV, Working Party XV/1, Document AVC–445b, Feb. 1993.

Primary Examiner—Richard Lee

[57] ABSTRACT

A system and method controls an encoder data buffer. The system includes an encoder for encoding input data as a first bit sequence in a bitstream; a processor having a predetermined size for converting the first bit sequence to a sequence having the predetermined size; and a decoder for decoding the modified bit sequence. The processor generates a set of modified bit sequences for facilitating editing thereof, in which the set of modified bit sequences, assembled in an arbitrary order, are decodeable by the decoder to generate a decoded output signal free of editing artifacts. The modified bit sequences are generated by inserting bits to the first bit sequence. The encoder encodes the input data at a rate such that a final capacity of the data buffer is less than a function of the predetermined size, a desired decoding rate, and an initial capacity of the encoder buffer. The data buffer has a total buffer capacity which is less than a function of the actual rate and the desired decoding rate. The capacity of the data buffer is less than one half the capacity of the decoder buffer. A method controls a data buffer by receiving input data; encoding the input data to generate a first bit sequence; detecting a condition of the first bit sequence having a size of less than a predetermined size; converting the first bit sequence to sets of modified bit sequences having the predetermined size; receiving the bitstream; and decoding the modified bit sequences.

31 Claims, 3 Drawing Sheets

METHOD FOR CONTROLLING A COMPRESSED DATA BUFFER

This application is a continuation of application Ser. No. 08/327,176, filed on Oct. 21, 1994 now abandoned.

BACKGROUND OF THE INVENTION

1. Field of the Invention

This disclosure relates to data buffers and, in particular, to a system and method for controlling a data buffer for transmitting compressed data.

2. Description of the Related Art

In server applications it is desirable to convert input data to bit sequences insertable in a bit stream for transmission. For example, in the Motion Picture Experts Group Standard (MPEG), input video data is encoded as compressed bitstreams as specified in the MPEG standard specification; i.e. MPEG TEST MODEL 4, "Coded Representation of Picture and Audio Information", ISO-IEC/JTC1/SC29/EG11, CCITT SG XV, Working Party XV/1, Document AVC-445b, February 1993. It is advantageous to store the compressed input data in short independently decodable bit sequences representing clips such as video clips, where a clip is defined to be a sequence of video frames. It is preferable to have such clips encoded and stored for later transmission in an arbitrary order.

Such decoding from concatenated bit sequences allows for seamless switching to be performed between different bitstreams at certain access points. It is preferred that switching be performed without gaps or loss of data at the switching points and without buffer underflow overflow at times after performing the switching. These features would be applicable for inserting advertisement clips into MPEG bitstreams, as well as jumping from one access point to another in the same bitstream or looping on a particular clip.

SUMMARY

A system and method for controlling a data buffer is disclosed, with the system including an encoder for encoding input data as a first bit sequence; a processor including the data buffer and operatively associated with the encoder for detecting a condition of the first bit sequence having a size of less than a predetermined size, and for converting the first bit sequence to a first modified bit sequence in the bitstream, the modified bit sequence having the predetermined size, and a decoder for decoding the modified bit sequence. The processor generates the modified bit sequence by inserting at least one predetermined bit, such as a logical 0 bit, into the first bit sequences. In addition, the encoder and decoder include means for encoding and decoding, respectively, the input data according to the Motion Picture Experts Group (MPEG) standard, with the decoder buffer having a predetermined fixed capacity.

The method controls a data buffer comprising the steps of receiving input data; encoding the input data using an encoder to generate a first bit sequence; detecting a condition of the first bit sequence having a size of less than a predetermined size; converting the first bit sequence having a size less than the predetermined size to a modified bit sequence in the bitstream, the modified bit sequence having the predetermined size; receiving the bitstream; and decoding the modified bit sequence.

BRIEF DESCRIPTION OF THE DRAWINGS

The features of the disclosed data buffer control system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
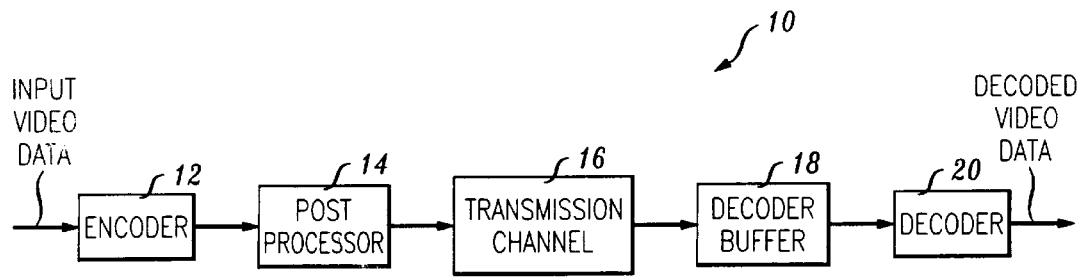
FIG. 1 is a block diagram of the disclosed data buffer control system.

Referring now in specific detail to the drawings, with like reference numerals identifying similar or identical elements, as shown in FIG. 1, the present disclosure relates to a data buffer control system and method for processing encoded data.

Referring to an exemplary embodiment shown in FIG. 1, input data such as input video data is input to an encoder 12 which encodes the input data to a compressed data bitstream. A postprocessor 14 processes the bitstream to insert bit sequences therein, and the modified bitstream is then transmitted via a transmission channel 16 for reception by a decoder buffer 18 associated with a decoder 20. The decoder 20 decodes the modified bitstream to extract the video data.

Figure 2:
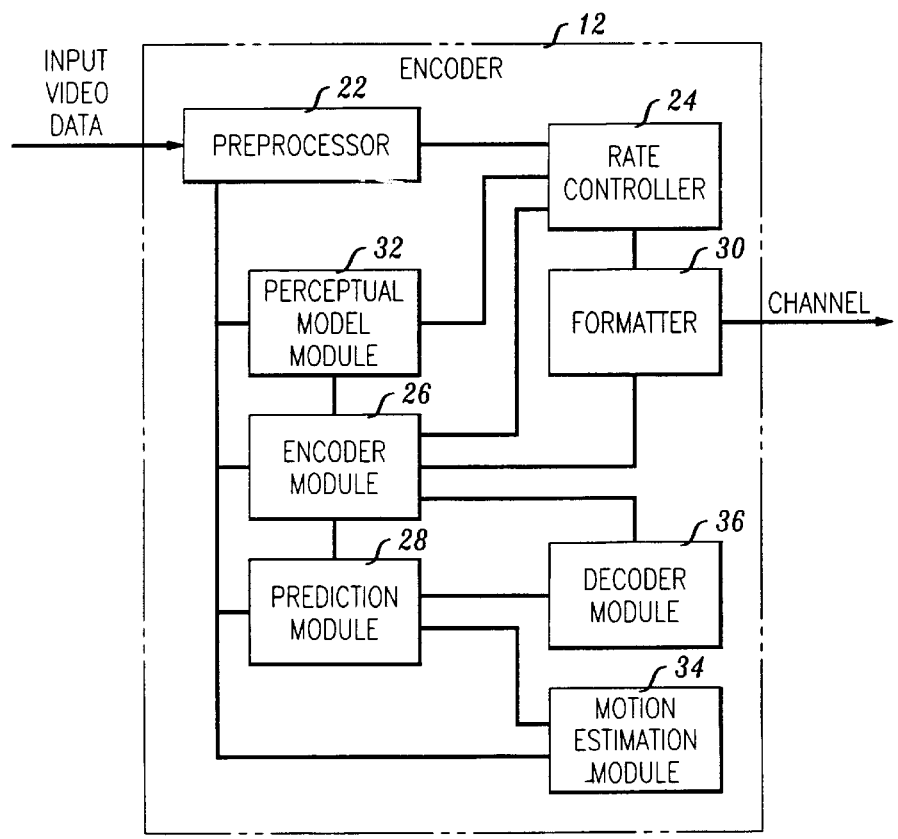
FIG. 2 is a block diagram of an exemplary video encoder.

As shown in the exemplary embodiment of FIG. 2, the encoder 12 includes: a preprocessor 22 for detecting film frames and scene changes in a video input; a rate controller 24; an encoder module 26; a prediction module 28; a formatter 30; a perceptual model module 32; a motion estimation module 34; and a decoder module 36. These components of the video encoder 12 may be implemented in a manner known in the art, as described, for example, in U.S. Pat. Nos. 5,144,423 to Knauer et al.; 5,231,484 to Gonzales at ale; 5,247,363 to Sun et al.; 5,293,229 to Iu; and 5,325,125 to Naimpally et al., each of which are incorporated herein by reference. In an exemplary embodiment, the compressed buffer control system 10 having encoder 12 and decoder 20 are implemented according to the Motion Picture Experts Group (MPEG) standard.

Generally, for the data buffer control system and method disclosed herein, the preprocessor 22 receives input video data and removes redundant fields from video data corresponding to a film source. The rate controller 24 receives data signals such as flags from the preprocessor 22 to control the operation of the encoder 12 for performing encoding functions. The rate controller 24 also controls communications of the encoder 12 with external systems in order to maintain the encoded bit rate within an operating bandwidth using control signals such as a video buffer verify delay (VBV_DLY) signal. The encoder module 26 receives processed video data from the preprocessor 22 as well as prediction estimates from the prediction module 28 for encoding the preprocessed video data. The formatter 30 combines the various data fields with blocks of pixels of video frames to generate an encoded output signal for output through an output channel.

The perceptual model module 32 calculates coding parameters for the encoding process, and the motion estimation module 24 performs block matching of video data in a current block of pixels with previous image data to generate motion factors. The decoder module 36 generates a reconstructed prediction error from the encoding process to construct a decoded image.

Figure 3:
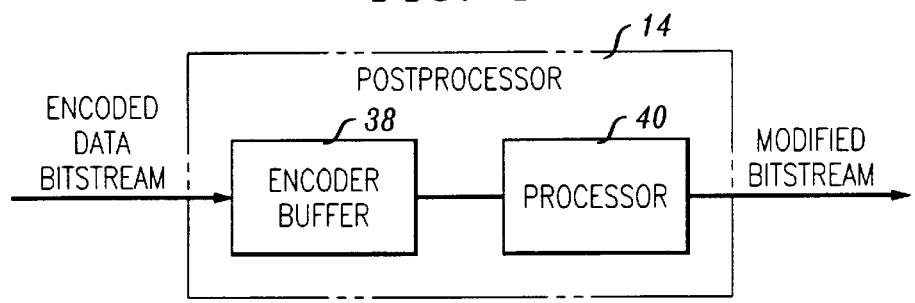
FIG. 3 is a block diagram of a postprocessor.

As shown in FIG. 3, the postprocessor 14 includes an encoder buffer 38 having memory for receiving and storing the incoming bitstream and the VBV_DLY signal from the encoder 12. A processor 40 processes the bitstream to insert bits and bit sequences to the bitstream as described hereafter, as well as to revise the VBV_DLY signal to reflect the modification of the bitstream. In an exemplary embodiment, the postprocessor 14 is a SPARC workstation available from Sun Microsystems, Inc. having about 10 Megabytes associated RAM memory; a display, keyboard, and other input and output devices; and a hard or fixed drive storage device, with the encoder buffer 38 having means known in the art for capturing and storing the incoming bitstream.

The decoder buffer 18 and the decoder 20 are implemented in a manner known in the art. In particular, for the exemplary embodiment disclosed herein for an MPEG system, the decoder 20 implements MPEG decoding as specified in the MPEG standard specification.

The following discloses exemplary embodiments of the compressed data buffer system and method.

Generating Equal Size Clips

MPEG encoding generates a variable number of bits per frame, with a clip being at least one frame having associated bits, while the number of transmitted bits from the encoder 12 (which may be included in a server device) to decoder 20 per frame time is constant. This discontinuity is accounted for by including an elastic encoder buffer 38 in the postprocessor 14 between the encoder 12 and the transmission channel 16 or alternatively a transmitter or storage device. The difference between the actual number of bits generated for a series of frames and the number of bits in that many average frames is bounded by the size or capacity of the encoder buffer 38.

In an exemplary embodiment, the method of generating fixed length clips of size T is to encode the video clip at some actual rate $R_a$ that is less than the desired decoding rate $R_d$ and then to add "stuffing" or "padding"; i.e. irrelevant bits which may be predetermined such as logical 0 bits, to bring the clip up to the desired rate.

Figure 4:
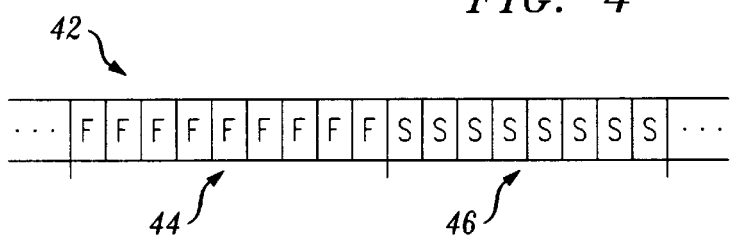
FIG. 4 illustrates an exemplary bitstream.
Figure 5:
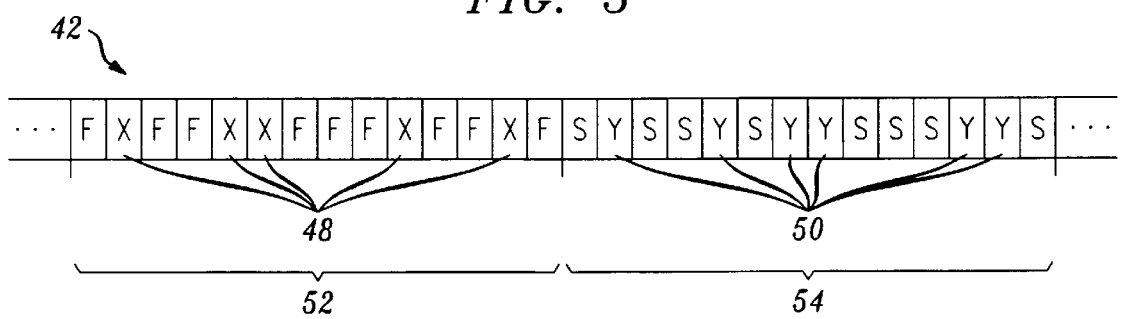
FIG. 5 illustrates the exemplary bitstream of FIG. 4 modified according to the disclosed video encoder control system.

As illustrated in FIG. 4, an exemplary bitstream 42 is shown having a first bit sequence 44 and a second bit sequence 46 from the encoder 12, represented by F's and S's respectively, in the MPEG standard prior to padding. As disclosed herein, the postprocessor 14 inserts a first sequence 48 of padding bits X and a second sequence 50 of padding bits Y to the bit sequences 44, 46, respectively, to generate the first modified bit sequence 52 and the second modified bit sequence 54, respectively, as shown in FIG. 5, wherein the modified bit sequences 52, 54 have equal predetermined sizes. As stated above, the padding bits 48, 50 may be logical 0 bits. It is understood that the padding bits 48, 50 may be distributed throughout the respective bit sequences 44, 46.

The actual number of bits generated over the length of the clip T at rate $R_a$ is less than or equal to the average number of bits that would be generated at rate $R_d$ so that the clip may be stuffed up to the desired decoding rate. For an initial buffer occupancy $B_i$ and a final buffer occupancy $B_f$, then $$R_a T + B_f - B_i \leq R_d T \tag{1}$$

or $$(R_d - R_a)^* T \geq B_f - B_i \tag{2}$$

Setting $\Delta R = R_d - R_a$ and, in a worst case situation, $B_f - B_i = B_c$, the overall encoder buffer capacity, then $$T\Delta R \geq B_e \tag{3}$$

Eq. (3) shows that the encoder buffer capacity is to be less than the product of the length of the clip and the difference in actual and desired rates in order to stuff the clips or other data sequences to attain the desired decoding rate. This is determined by replacing $B_f - B_i$ with $B_c$, the overall capacity of the encoder buffer 38, in the worst case situation for the encoder buffer 38. Clips of equal size may then be generated by satisfying the condition of Eq. (3) above as a first constraint.

For bitstreams placing such equal size clips end to end for decoding by the decoder 20, additional constraints are to be provided for the generation of the clips. When stuffing is added at a constant rate to a clip to pad the clip up to the predetermined size, decoding of the padded clips may cause a buffer underflow in the decoder 20. Underflow of the decoder 20 may be prevented by setting the sum of the encoder buffer capacity $B_c$ and the maximum amount of stuffing $T \Delta R$ to be less than the capacity $B_d$ of the decoder buffer 18. This prevention method is expressed as:

$$B_e + T\Delta R \leq B_d - B_e \tag{4}$$

or $$T\Delta R \leq B_d - B_e \tag{5}$$

Thus Eq. (5) is a second constraint for preventing underflow in the decoder 20.

Combining Eq. (3) and (5), then $$B_e \leq T\Delta R \leq B_d - B_e \tag{6}$$

or since the buffer capacities are positive numbers.

$$\frac{B_e}{B_d} \leq \frac{T\Delta R}{B_d} \leq 1 - \frac{B_e}{B_d} \tag{7}$$

From the outer terms of Eq. (7), one may obtain $$\frac{B_e}{B_d} \leq \frac{1}{2} \tag{8}$$

The capacity $B_d$ of the decoder buffer 18 is fixed according to the MPEG standard. For an encoder buffer 38 being as large as possible as a third constraint, then from Eq. (8), $$\frac{B_e}{B_d} = \frac{1}{2} \tag{9}$$

and from Eq. (7) and (9), then $$\frac{T\Delta R}{B_d} = \frac{1}{2} \tag{10}$$

Eq. (10) then gives a relationship between T, the length or time duration of the clips, and $\Delta R$, the difference between the actual encoded rate and the rate at which the clip is decoded.

For example, in a decoder having a 1.75 megabit (Mbit) capacity, exemplary lengths and rate values are listed in Table 1 below.

TABLE 1

| Length (sec) | ΔR (Mbit/sec) | % of 3 Mbit/sec |
|---|---|---|
| .5 | 1.75 | 58 |
| 1 | .875 | 29 |
| 2 | .438 | 15 |
| 5 | .175 | 6 |
| 10 | .088 | 3 |
| 30 | .029 | 1 |
| 60 | .015 | .5 |

For example, for a 3 Mbit/sec desired decoding bit rate, a value of T=10 sec. reduces the effective bit rate by 3%, having only a relatively small impact, whereas a value of T=2 sec. reduces the effective bit rate by a noticeable 15%.

Thus, by putting relatively minor restrictions on the operation of a MPEG encoder such as encoder 12, the output of encoder 12 may be formatted by the postprocessor 14 into equal size concatenable clips. As shown in Table 1, there is a trade-off between the size of the clip and the effective bit rate or effective quality of the encoded bitstream.

Figure 6:
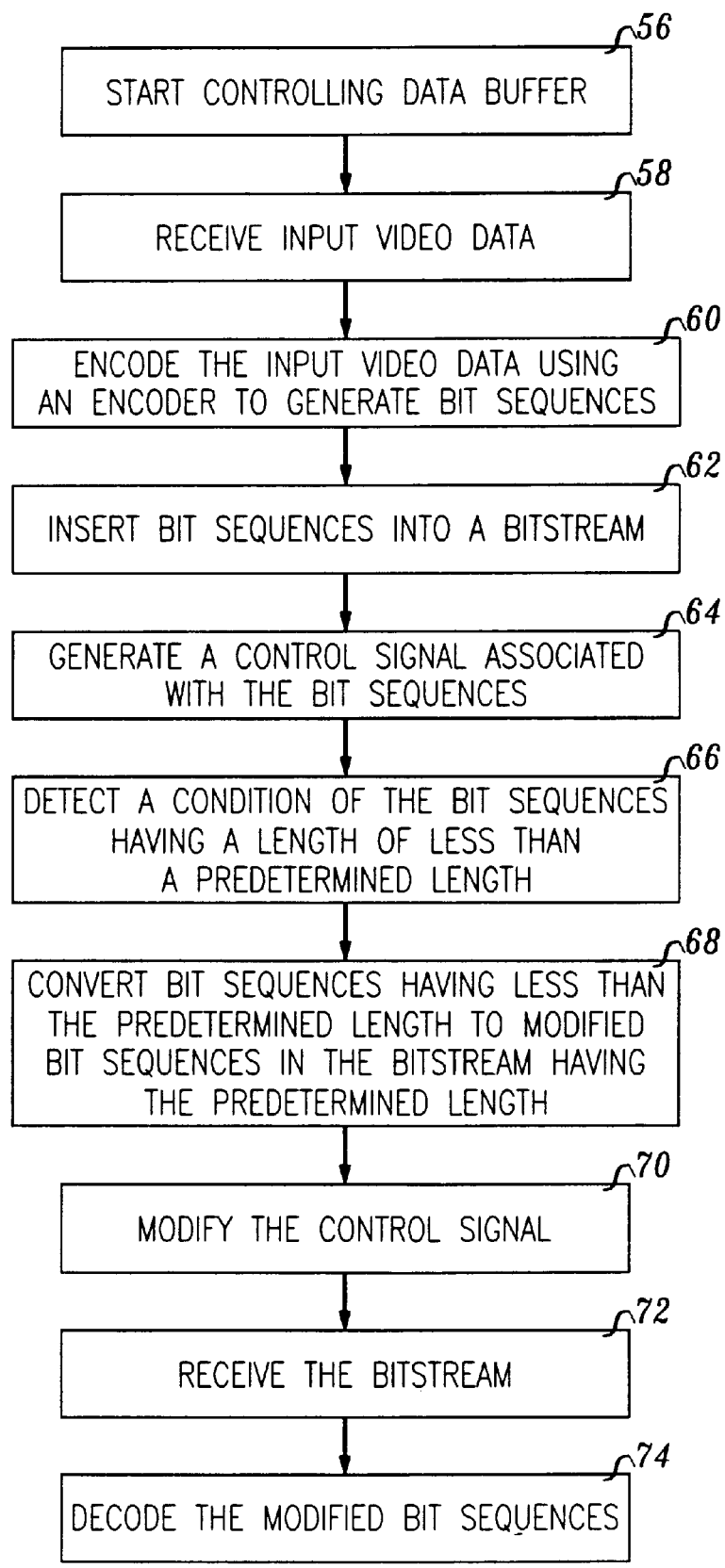
FIG. 6 is a flow chart of the method and operation of the disclosed video encoder control system.

Referring to FIG. 6, the disclosed data buffer control system operates by the method disclosed herein, including the steps of starting the controlling of the data buffer in step 56; receiving input video data in step 58; encoding the input video data using the encoder 12 to generate bit sequences in step 60; transmitting the bit sequences in a bitstream in step 62; and generating a control signal, for example, the VBV_DLY signal associated with the bit sequences in step 64.

The postprocessor 14 detects a condition of the bit sequences having a size of less than a predetermined size in step 66; converts the bit sequences having the size less than the predetermined size to modified bit sequences in the bitstream having the predetermined size in step 68; and modifying the control signal in step 70. The decoder buffer 18 receives the bitstream in step 72, and the decoder 20 decodes the modified bit sequences in step 74.

While the disclosed data buffer control system and method has been particularly shown and described with reference to the preferred embodiments, it will be understood by those skilled in the art that various modifications in form and detail may be made therein without departing from the scope and spirit of the inventions Accordingly, modifications such as those suggested above, but not limited thereto, are to be considered within the scope of the invention.

What is claimed is:

1. A system comprising:
an encoder for encoding input data as a first bitstream; and
a processor for receiving as input the first bitstream and for generating as an output a second bitstream by inserting padding bits into the first bitstream so that said second bitstream is comprised of equal length bit sequences, each of said equal length bit sequences being developed from a respective portion of said first bitstream;
wherein each of the equal length bit sequences is an independently decodeable clip comprising a sequence of frames, so that a seamless transition is made from said second bitstream to a third bitstream comprised of encoded input data, after completion of one of said equal length bit sequences of said second bitstream, while underflow or overflow as a result of said transition in a decoder buffer of a decoder which is operable to decode a resulting bitstream is avoided.

2. The system of claim 1 further comprising an encoder data buffer associated with the encoder wherein the capacity of the encoder data buffer is less than one half the capacity of the decoder buffer.

3. The system of claim 1 wherein the encoder and decoder include means for encoding and decoding the input data according to the Motion Picture Experts Group (MPEG) standard, with the decoder buffer having a predetermined fixed capacity.

4. The system of claim 1 wherein the padding bits are each the same predetermined logic level.

5. The system of claim 1 wherein the processor generates the second bitstream by inserting predetermined bits into the first bitstream such that the second bitstream has a size Rd*T, in which Rd is a desired bit rate and T is the duration of the second bitstream after decoding by the decoder.

6. The system of claim 1 wherein said third bitstream is a portion of said second bitstream.

7. The system of claim 1 wherein said third bitstream is distinct from said second bitstream.

8. The system of claim 1 wherein the encoder encodes the input data at an actual rate $R_a$ such that $$Ra*T+Bf-Bi \leq Rd*T$$

where T is a predetermined length, $R_d$ is a desired decoding rate, and $B_i$ and Bf are the initial and final occupancies of an encoder data buffer.

9. The system of claim 8 wherein the encoder encodes the input data at an actual rate $R_a$ such that $$T*(R_d-R_a) \leq B_d-B_e,$$

where $B_d$ is the capacity of the decoder buffer, and $B_e$ is the capacity of the encoder data buffer.

10. The system of claim 8 wherein the encoder data buffer has a total buffer capacity $B_e$, wherein $$B_e \leq T*(R_d-R_a)$$

where T is the predetermined length and $R_d$ is a desired decoding rate.

11. A system comprising:
an encoder for encoding input data as a first bit sequence in a first bitstream, said first bit sequence having a length, in number of bits, less than a predetermined length; and
a processor for receiving as input the first bit sequence of the first bitstream and for generating as an output a second bit sequence which is exactly the predetermined length, a second bitstream being generated by the processor inserting padding bits into the first bitstream;
wherein said second bit sequence is an independently decodeable clip comprising a sequence of frames so that a transition from said second bitstream to a third bitstream comprised of encoded input data, after completion of said second bit sequence, is seamless and avoids underflow or overflow as a result of said transition in a decoder buffer of a decoder which is operable to decode a resulting bitstream.

12. The system of claim 11 wherein said third bitstream is a portion of said second bitstream.

13. The system of claim 11 wherein said third bitstream is distinct from said second bitstream.

14. The system of claim 11 wherein each of the encoder and the decoder operates according to the Motion Picture Experts Group (MPEG) standard as an MPEG encoder and an MPEG decoder, respectively.

15. The system of claim 14 wherein the encoder generates a VBV_DLY signal corresponding to the first bit sequence; and the processor responds to the generation of the second bit sequence to update the VBV_DLY signal to correspond to the second bit sequence.

16. A method comprising the steps of:

receiving input data;

encoding the input data using an encoder having a data buffer to generate a first bit sequence in a bitstream;

receiving as input the first bit sequence; and selectively inserting padding bits into the first bitstream so as to generate as output a set of modified bit sequences of equal bit sequence lengths in the bitstream for facilitating reordering of the equal length bit sequences, wherein the set of modified bit sequences, assembled in an arbitrary order, are decodeable by a decoder to generate a decoded output signal, whereby seamless switching of different bit sequences is facilitated.

17. The method of claim 16 wherein the steps of encoding and decoding include the step of encoding and decoding the input data according to the Motion Picture Experts Group (MPEG) standard.

18. The method of claim 16 further comprising the steps of:

receiving the bitstream; and decoding the set of modified bit sequences to generate the decoded output signal free of editing artifacts.

19. The method of claim 16 wherein the steps of encoding and decoding include the steps of encoding and decoding input video data, respectively, according to the Motion Picture Experts Group (MPEG) standard using an MPEG encoder and an MPEG decoder, respectively.

20. The method of claim 19 wherein the steps of encoding the input video data includes the step of encoding a video clip as the first bit sequence.

21. A system comprising:

an encoder for encoding input data as a first bitstream;

a processor for receiving as input the first bitstream and for selectively inserting padding bits into the first bitstream so as to generate as output a set of modified bit sequences of equal bit sequence lengths for facilitating reordering of the equal length bit sequences, wherein the set of modified bit sequences, assembled in an arbitrary order, are decodeable by a decoder to generate a decoded output signal, whereby seamless switching of different bit sequences is facilitated.

22. The system of claim 21 wherein capacity of an encoder data buffer within said processor is less than one half of a predetermined buffer size.

23. The system of claim 21 wherein the encoder includes means for encoding and decoding the input data according to the Motion Picture Experts Group (MPEG) standard.

24. The system of claim 21 wherein the padding bits are each the same predetermined logic level.

25. The system of claim 24 wherein the predetermined logic level is logical 0.

26. The system of claim 21 wherein the encoder encodes the input data at an actual rate $R_a$ such that a final capacity $B_f$ of an encoder data buffer is less than $$T^*(R_d-R_a)+B_i,$$

where T is a predetermined length, $R_d$ is a predetermined rate, and $B_i$ is an initial capacity of the encoder data buffer.

27. The system of claim 26 wherein the encoder encodes the input data at an actual rate $R_a$ such that $$T^*(R_d-R_a) \leq B_d-B_e,$$

where $B_d$ is a predetermined buffer capacity, and $B_e$ is the capacity of the encoder data buffer.

28. The system of claim 26 wherein the encoder data buffer has a total buffer capacity $B_e$, wherein $$B_e \leq T^*(R_d-R_a)$$

where T is the predetermined length and $R_d$ is a predetermined rate.

29. A method comprising the steps of:

receiving input data;

encoding the input data using an encoder to generate first bit sequences in a first bitstream;

receiving as input the first bitstream;

selectively inserting padding bits into the first bitstream so as to generate as output a set of modified bit sequences of equal length in the first bitstream for facilitating reordering of the equal length bit sequences, wherein the set of modified bit sequences, assembled in an arbitrary order, are decodeable by a decoder to generate a decoded output signal, whereby seamless switching of different bit sequences is facilitated; and transmitting the bitstream including the modified bit sequences.

30. The method of claim 29 wherein the step of encoding includes the step of encoding the input data according to the Motion Picture Experts Group (MPEG) standard.

31. The method of claim 29 wherein the steps of encoding the input data includes the step of encoding a video clip as the first bit sequence.

* * * * *